United States Patent [19]

Yasuno et al.

[11] Patent Number: 5,069,089
[45] Date of Patent: Dec. 3, 1991

[54] METHOD OF MACHINING A PRESS DIE

[75] Inventors: Toshio Yasuno; Toshihiro Thukagoshi; Shinji Hoshii; Yasuo Imaizumi, all of Gunma, Japan

[73] Assignees: Fuji Jukogyo Kabushiki Kaisha, Tokyo; Teikoku Kuromu Co., Ltd., Nagoya, both of Japan

[21] Appl. No.: 585,668

[22] Filed: Sep. 20, 1990

[30] Foreign Application Priority Data

Sep. 22, 1989 [JP] Japan ................................. 1-244974

[51] Int. Cl.⁵ .............................................. B21K 5/20
[52] U.S. Cl. .................................................. 76/107.1
[58] Field of Search ........................... 76/107.1, 101.1; 51/281 R

[56] References Cited

U.S. PATENT DOCUMENTS 4,446,351  5/1984  Kawaguchi et al. .............. 76/107.1

Primary Examiner—Roscoe V. Parker
Attorney, Agent, or Firm—Beveridge, DeGrandi & Weilacher

[57] ABSTRACT

A method of machining a press die. A scabrous surface is formed by cutting a die block of the press die. Then, part of the scabrous surface of the die block is ground to form a smooth surface. The part contacts with a work from an initial stage of press working of the work by the press die. Finally, a friction resistant material layer is coated over the smooth surface.

9 Claims, 3 Drawing Sheets

METHOD OF MACHINING A PRESS DIE

BACKGROUND OF THE INVENTION

The present invention relates to a method of machining a press die for press working.

The press die comprises an upper die, a lower die, and a guide unit for guiding the dies. The press die is roughly machined to form various contours (shapes), so that there remain many cutter marks which are so called cusps. The cusps are ground and then the surfaces are coated with a wear resistant material to enhance wear resistance as described in Japanese Utility Model (unexamined) Publication No. 63 (1988)-138924.

The cusps are removed to smooth whole surfaces of the press die by grinding, and hence a grinding operation requires many manhours. Moreover, it is hard to obtain accurate matching of the upper and lower dies with a very small clearance in the whole area. If the accurate matching is insufficient, a sheet metal is locally and strongly pressed, and therefore an excessively large clearance can be formed. When the work is locally and strongly pressed, an excessively large load is applied to a press unit, and a shape of the final product does not become sharp since the press working is not performed at a lower dead point. When the clearance at a portion of a work is excessively large, the work does not match with the surfaces of the press die. And a desired shape of the product cannot be produced. In addition, the accuracy of the products may change lot by lot.

SUMMARY OF THE INVENTION

Accordingly, it is an object of the present invention to provide a method of machining a press die, in which method the machining of the press die is simplified to reduce production time and cost of the press die.

It is another object of the present invention to provide a method of machining a press die, in which the accuracy of the clearance between upper and lower dies is maintained to machine a desired shape of pressed products.

It is still another object of the present invention to provide a method of machining a press die, wherein the method provides proper draft of the press die by sufficient slip to the work during press working thereof.

In view of these and other objects, the present invention provides a method of machining a press die. A scabrous surface is formed by cutting a die block of the die press. Then, part of the scabrous product forming surface of the die block is ground to form a smooth surface, which contacts with a work from an initial stage of press working of the work by the press die. Finally, a friction resistant material layer is coated over the smooth surface.

DETAILED DESCRIPTION OF THE PREFERRED EMBODIMENTS

Prior to the description of a preferred embodiment of the invention, the known method of machining the press die discussed before will be described briefly below for a better understanding of the background art and disadvantages thereof.

Figure 6A:
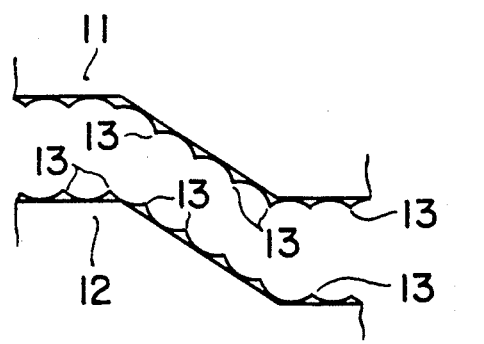
FIGS. 6A to 6C are fragmentary schematic side views illustrating how to machine the press die according to the prior art.
Figure 6B:
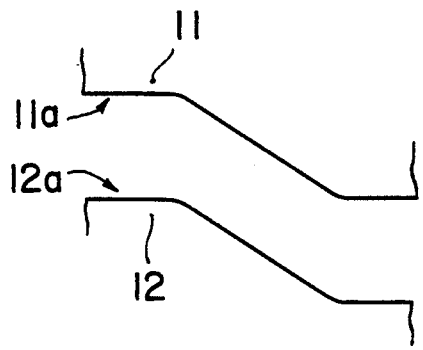
Figure 6C:
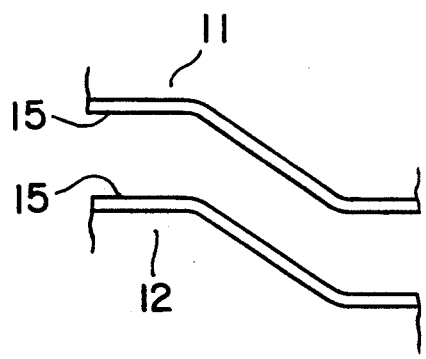

FIGS. 6A to 6C illustrate the known method of machining the press die. As shown in FIG. 6A, die blocks are machined by a profile milling machine or an NC milling machine using a ball end mill or a taper cutter to form machined scabrous surfaces. In these machined surfaces, there are produced cusps 13. Then, the cusps 13 are removed by grinding to form smooth surfaces 11a and 12a (FIG. 6B). This grinding operation is carried out by electro-discharge machining, electro-chemical machining, ultrasonic polishing, or a hand tool such as a file. The ratio of the manhour of the grinding operation and machining the press die is relatively high, generally 15 to 45%. This grinding operation is performed to prevent the surfaces 11a and 12a of the press die from producing scars in the work, as well as adjusting the clearance between the upper and lower dies 11 and 12.

Each surface is plated with a hard chromium layer 15 to enhance frictional resistance (FIG. 6C).

A method of machining a press die according to the present invention is illustrated in FIGS. 1 to 5, in which parts corresponding to parts in FIGS. 6A to 6C are designated by the same reference numerals and descriptions thereof are omitted.

Figure 1:
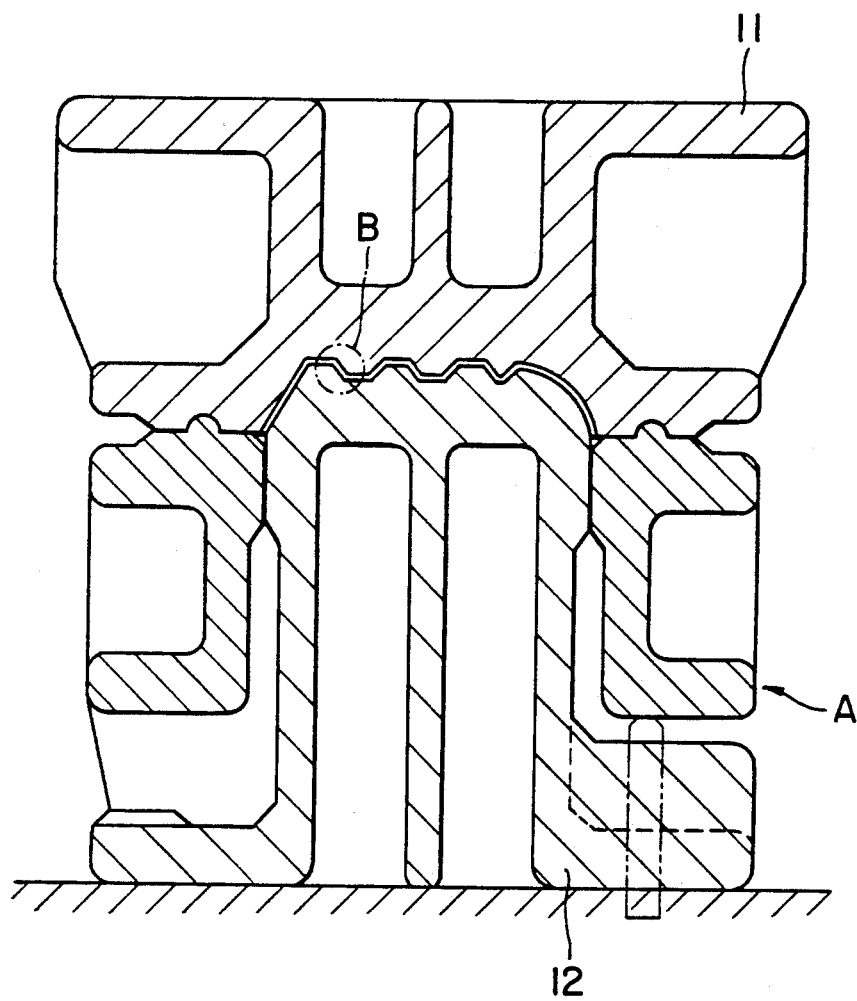
FIG. 1 is a side view of a press die according to the present invention.

Referring to FIG. 1, the press die is provided with the upper die 11, the lower die 12 and a holding member A for holding the work with the upper die 11.

Figure 2A:
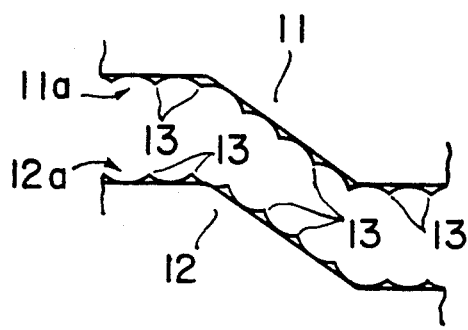
FIGS. 2A to 2C are fragmentary schematic side views of the encircled part in FIG. 1, illustrating how to machine a press die according to the present invention.

Also in the present invention, die blocks are machined by a profile milling machine or an NC milling machine using a ball end mill or a taper cutter to form a scabrous surface 11a of the lower die 11 and a scabrous surface 12a of the lower die 12 (FIG. 2A). Preferably, the height 1 of cusps 13 formed in the surfaces 11a and 12a is about 45 to 50 micrometers in view of a pitch (pick-feed) P (FIG. 5) of the ball end cutter or the taper cutter. The smaller the pitch is, the longer the time to form the surfaces 11a and 12a is. On the other hand, the number of cusps 13 are reduced by enlarging the radius of the cutter used but the shape of the final product does not become sharp.

Figure 2B:
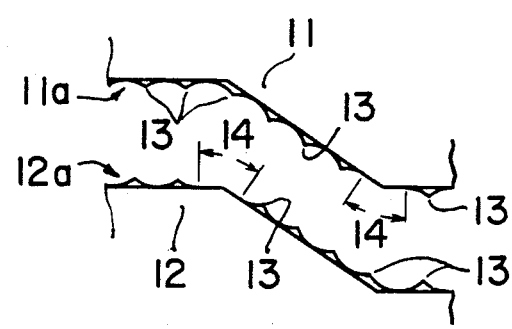

Then, convex or outwardly curved portions 14 of the surfaces 11a and 12a are smoothly ground to adjust the clearance between the lower die 11 and lower die 12 (FIG. 2B). Each of the convex portions 14 makes a contact with a steel plate work from an initial stage of the press working. This grinding operation is also carried out by the conventional processing already described with reference to the prior art of the present invention.

Figure 2C:
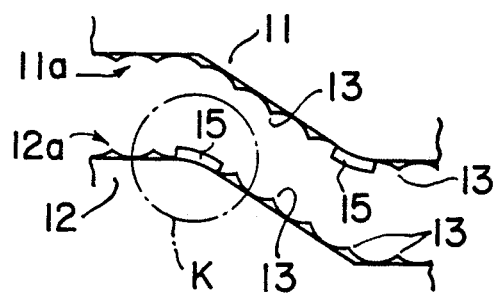
Figure 3:
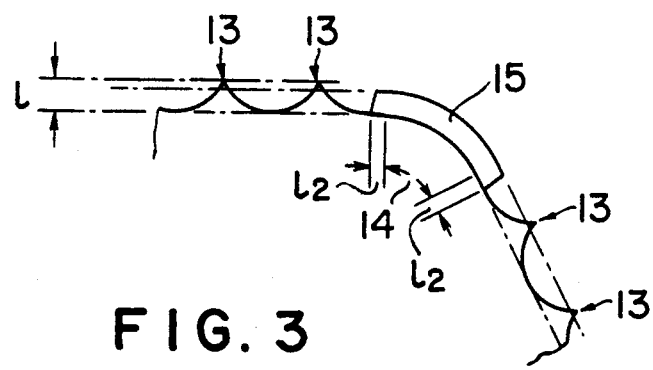
FIG. 3 is an enlarged fragmentary schematic side view of the encircled part of the lower die in FIG. 2C.

Finally, each of the ground smooth convex portions 14 is plated with a wear resistant hard chrominum layer 15 (FIG. 2C). The encircled portion K of FIG. 2C is illustrated in FIG. 3 in an enlarged scale. As shown, each hard chromium layer 15 is preferably formed in such a manner that the layer 15 covers the corresponding convex portion 14 to extend beyond opposite edges of the convex portion 14 by a length $l_2$ about 1 to about 2 mm. The edges represent boundary lines between the convex portions 14 and a flat portion of the forming surfaces 11a and 12a. This is easily made by applying a masking tape around the portion to which the plating is carried out.

In this embodiment, only the convex portions 14 which come into contact with a work from an initial stage of the pressworking are ground to have smooth surfaces, and the convex portions relate to clearance adjustment of the press die. Thus, the clearance between the upper die 11 and the lower die 12 is set within a range from $t \times 1.0$ to $t \times 1.1$ where t is a thickness of the work, and hence the pressed product is fairly improved in accuracy. On the other hand, in the prior art, in which all the cusps 13 are removed, the clearance is from $t \times 1.0$ to $t \times 1.5$. Moreover, the feature of the embodiment reduces the time and the cost of producing the die press and improves drawability of the press die since the press die fairly allows a slip of the work due to a considerable reduction in area of contact between the work and the press die.

Figure 4:
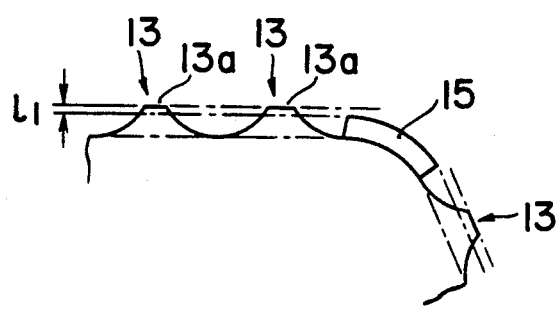
FIG. 4 is a side view of a modified form of cusps of FIG. 3.
Figure 5:
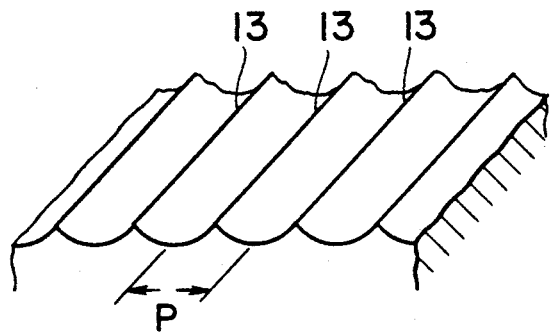
FIG. 5 is a fragmentary perspective view of cusps of FIG. 2A.

As illustrated in FIG. 4, to improve contact of the press die to the steel plate work the cusps 13 are preferably truncated by grinding so that the tops 13a thereof are the same level with or slightly higher ($l_1$ = about 5 to about 10 micrometers) than the outer surface of each hard chromium layer 15.

Other wear resistant materials, such as a ceramic, may be coated over the convex portions 14 instead of hard chromium.

While the presently preferred embodiments of the present invention have been shown and described, it is to be understood that these disclosures are for the purpose of illustration and that various changes and modifications may be made without departing from scope of the invention as set forth in the appended claims.

What is claimed is:

1. A method of machining a press die, comprising the steps of:
    forming a scabrous surface by cutting a die block of the press die;
    grinding part of the scabrous surface of the die block to form a smooth surface, the part being adapted to make a contact with a work from an initial stage of press working of the work by the press die; and
    coating a friction resistant material layer over the smooth surface.

2. A method as recited in claim 1, wherein the smooth surface is a convex portion.

3. A method as recited in claim 2, wherein the friction resistant material layer is a hard chromium layer.

4. A method as recited in claim 1, further comprising the step of grinding a cusp in the scabrous surface so that the cusp has a substantially equal height of the friction resistant material layer.

5. A method as recited in claim 4, wherein the smooth part is a curved portion of the porduct forming surface.

6. A method as recited in claim 5, wherein the friction resistant material layer is a hard chromium layer.

7. A method as recited in claim 5, wherein the friction resistant material layer is a ceramic.

8. A method as recited in claim 5, wherein the friction resistant material layer is plated over the curved portion of the product forming surface, having opposite edges, so that the layer slightly extends beyond the opposite edges of the curved portion.

9. A method as recited in claim 8, wherein the friction resistant material layer extends 1 to 2 mm beyond the edges of the curved portion.

* * * * *